United States Patent
Shrivastava et al.

(10) Patent No.: US 12,114,286 B2
(45) Date of Patent: Oct. 8, 2024

(54) METHODS AND SYSTEMS FOR POWER SAVING AND PAGING REDUCTION IN A WIRELESS COMMUNICATION NETWORK

(71) Applicant: SAMSUNG ELECTRONICS CO., LTD., Suwon-si (KR)

(72) Inventors: Vinay Kumar Shrivastava, Bangalore (IN); Avijit Manna, Bangalore (IN)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 228 days.

(21) Appl. No.: 17/397,128

(22) Filed: Aug. 9, 2021

(65) Prior Publication Data

US 2022/0046582 A1 Feb. 10, 2022

(30) Foreign Application Priority Data

Aug. 7, 2020 (IN) .............................. 202041033947
Aug. 4, 2021 (IN) ............................. 202041033947

(51) Int. Cl.
*H04W 52/02* (2009.01)
*H04W 56/00* (2009.01)
*H04W 68/00* (2009.01)
*H04W 68/02* (2009.01)
*H04W 72/1263* (2023.01)
*H04W 72/23* (2023.01)

(52) U.S. Cl.
CPC ..... *H04W 68/005* (2013.01); *H04W 52/0229* (2013.01); *H04W 56/001* (2013.01); *H04W 72/1263* (2013.01); *H04W 72/23* (2023.01)

(58) Field of Classification Search
CPC ............ H04B 7/0695; H04W 52/0229; H04W 56/001; H04W 68/005; H04W 68/02; H04W 72/1263; H04W 72/23; H04W 76/27; Y02D 30/70
See application file for complete search history.

(56) References Cited

U.S. PATENT DOCUMENTS

| | | | |
|---|---|---|---|
| 2014/0146678 A1* | 5/2014 | Merlin | H04W 68/025 370/235 |
| 2021/0250899 A1* | 8/2021 | Liu | H04W 16/14 |
| 2021/0337507 A1* | 10/2021 | Selvaganapathy | H04W 68/02 |
| 2022/0124674 A1* | 4/2022 | Babaei | H04W 68/02 |
| 2022/0312327 A1* | 9/2022 | Xu | H04W 52/0274 |
| 2023/0108646 A1* | 4/2023 | Tseng | H04W 68/025 455/458 |

* cited by examiner

*Primary Examiner* — Derrick W Ferris
*Assistant Examiner* — M Mostazir Rahman
(74) *Attorney, Agent, or Firm* — F. CHAU & ASSOCIATES, LLC

(57) ABSTRACT

The present subject matter refers targeting paging reduction to improve upon power consumption performance for the user equipment in wireless networks. The methods and systems are disclosed where indication signal is applied for idle/inactive mode UEs. In one embodiment of the present disclosure, an indication signal is introduced for idle/inactive mode UEs for paging reception. In another embodiment, the group of UEs may be divided into plurality of paging sub-groups of UEs having common paging occasion and each paging sub-group be assigned a paging sub-group ID. This paging sub-group ID may be incorporated in the indicating signal to reduce paging reception. The indicating signal may indicate presence or absence of paging DCI for a UE/or a paging sub-group identity of UE/UEs.

18 Claims, 11 Drawing Sheets

METHODS AND SYSTEMS FOR POWER SAVING AND PAGING REDUCTION IN A WIRELESS COMMUNICATION NETWORK

CROSS-REFERENCE TO RELATED APPLICATIONS

The present application claims priority under 35 U.S.C. § 119 to Indian Provisional Patent Application No. 202041033947, filed on Aug. 7, 2020, and Indian Non-Provisional Patent Application No. 202041033947, filed on Aug. 4, 2021, the entire contents of both applications are incorporated by reference herein.

FIELD OF THE INVENTION

The present disclosure relates to wireless communication. In particular, the present disclosure relates to methods and systems for power saving and paging reduction in a wireless communication network.

BACKGROUND

In a wireless communication system, the network transmits paging messages to a group of user equipment (UEs) to indicate arrival of downlink contents (e.g. call, data, updated information etc.) for the UE. A UE in idle/inactive state mode, monitors paging messages and initiate appropriate procedures (e.g. connection setup procedure, reading/updating broadcast information etc.). In particular, the UE wakes up from the idle/inactive state to read the paging message.

FIG. 1 illustrates the legacy approach of paging in a wireless communication system. As shown in FIG. 1, upon reception of the paging message, the UE wakes up from its idle/inactive state. A New Radio (NR) UE or 5G UE in idle/inactive mode calculates its Paging Occasion (PO) and Paging Frame (PF) based on its UE ID and N, where UE ID is: 5G-S-TMSI mod 1024, and N is: number of total paging frames in DRX cycle T of UE. Based on the PO and PF, UE monitors Physical Downlink Control Channel (PDCCH) to read paging DCI i.e. Downlink Control Information and further reads the paging message. The UE may receive the paging message in DCI format 1_0 with CRC scrambled by P-RNTI i.e. Paging Radio Network Terminal Identifier. The UE can decide if the paging message is intended for it, only after reading the actual paging message, whereas, all other UEs discard the paging message as a False Alarm. This way, a group of UEs (paging group) reads PDCCH and further paging message based on respective UE_ID and N on the same PO and PF.

However, reception of paging messages in idle/inactive state invokes the UE to come out of the sleep mode and increases its power consumption. Also, the paging false alarm detection duration is one of the most power consuming activity in RRC_IDLE/RRC_INACTIVE states. It involves time duration until RRC layer processing for max 32 paging records. This time duration is extended for NR due to paging repetition across multiple beams in time domain.

Accordingly, there is a need to for techniques which reduce the power consumption in a user equipment (UE) in the idle/active mode. The present disclosure addresses the UE power consumption aspects in idle/inactive states with respect to reception of paging messages and associated procedures.

SUMMARY

This summary is provided to introduce a selection of concepts in a simplified format that are further described in the detailed description of the invention. This summary is not intended to identify key or essential inventive concepts of the invention, nor is it intended for determining the scope of the invention In an embodiment of the present disclosure, a method for reducing paging in a wireless communication, is disclosed. The method may comprise transmitting, by a network entity, a network message to a plurality of user equipment (UE), wherein the network message carries a network parameter and configuration information of a paging message scheduled to be transmitted at a predetermined time, wherein the configuration information includes at least one of a paging cycle, a paging frame (PF), a paging occasion (PO), a paging offset, a number of paging sub-groups in the cell (Nps), an indicating signal offset (ISO) and paging sub-groups information. The method may further comprise transmitting, by the network entity, an indicating signal at the indicating signal offset (ISO) prior to the scheduled transmission of the paging message, wherein the indicating signal indicates if at least one of the plurality of UE will be paged in next paging occasion or not. In another embodiment, the indicating signal indicates if at least one of the plurality of paging sub-groups will be paged in next paging occasion or not.

In another embodiment of the present disclosure, a method for reducing paging in a wireless communication, is disclosed. The method may comprise receiving, by a user equipment (UE), a network message transmitted by a network entity, wherein the network message carries a network parameter and configuration information of a paging message scheduled to be transmitted at a predetermined time, wherein the configuration information includes a paging cycle, a paging frame (PF), a paging occasion (PO), a paging offset, number of paging sub-groups in the cell (Nps), an indicating signal offset (ISO) and paging sub-groups information. The UE then determines the paging cycle, the paging frame (PF), the paging occasion (PO) and the paging-subgroups information, according to the network parameter. The method may further comprise receiving, by the UE, an indicating signal at the indicating signal offset (ISO) prior to receiving the scheduled transmission of the paging message at a predetermined time. The UE then decodes the indicating signal to determine if the UE will be paged in next paging occasion based on the indicating signal and the UE enters in a sleep mode upon determination that it will not be paged in the paging occasion. Further, in another embodiment, UE decodes the indicating signal to determine if the paging sub-group identity for the UE will be paged in the paging occasion based on the indicating signal; and enter by the UE, in a sleep mode upon determination that paging sub-group identity for the UE will not be paged in next paging occasion; and receiving paging message by the UE, upon determination that paging sub-group identity for the UE will be paged in next paging occasion.

In yet another embodiment of the present disclosure, a network entity for reducing paging in a wireless communication, is disclosed. The network entity may comprise a transceiver; a memory; and a processor coupled to the transceiver and the memory. The processor may be configured to: transmit a network message to a plurality of user equipment (UE), wherein the network message carries a network parameter and configuration information of a paging message scheduled to be transmitted at a predetermined time, wherein the configuration information includes a paging cycle, a paging frame (PF), a paging occasion (PO), a paging offset, a number of paging sub-groups in the cell (Nps), an indicating signal offset (ISO) and paging sub-groups information; and transmit an indicating signal at the indicating signal offset (ISO) prior to the scheduled transmission of the paging message, wherein the indicating signal indicates if at least one of the plurality of UE will be paged in next paging occasion or not. In another embodiment, the indicating signal indicates if at least one of the plurality of paging sub-groups will be paged in next paging occasion or not.

In still another embodiment of the present disclosure, a user equipment for reducing paging in a wireless communication, is disclosed. The user equipment may comprise a transceiver; a memory; and a processor coupled to the memory and the transceiver. The processor may be configured to: receive a network message transmitted by a network entity, wherein the network message carries a network parameter and configuration information of a paging message scheduled to be transmitted at a predetermined time, wherein the configuration information includes a paging cycle, a paging frame (PF), a paging occasion (PO), a paging offset, number of paging sub-groups in the cell (Nps), an indicating signal offset (ISO) and paging sub-groups information; determine the paging cycle, the paging frame (PF), the paging occasion (PO) and the paging sub-groups information, according to the network parameter; receive an indicating signal at the indicating signal offset (ISO) prior to receiving the scheduled transmission of the paging message at a predetermined time; decode the indicating signal to determine if the UE will be paged in the paging occasion based on the indicating signal; and enter by the UE, in a sleep mode upon determination that it will not be paged in next paging occasion. Further, in another embodiment, UE decodes the indicating signal to determine if the paging sub-group identity for the UE will be paged in the paging occasion based on the indicating signal; and enter by the UE, in a sleep mode upon determination that paging sub-group identity for the UE will not be paged in next paging occasion; and receiving paging message by the UE, upon determination that paging sub-group identity for the UE will be paged in next paging occasion.

In a further embodiment, the network entity may transmit the paging sub-group identity to the plurality of user equipment of a paging sub-group using at least one of a radio resource control (RRC) signalling and a non-access stratum (NAS) signalling.

In another embodiment, the user equipment may determine the paging sub-group identity using the below equation:

paging_sub_group ID=floor (UE_ID/($N*Ns$)) mod Nps, wherein N is number of paging frames, Ns is number of paging occasion per paging frame and Nps is number of paging sub-groups in a cell.

At least by virtue of aforesaid features, the present subject matter advantageously addresses at least the following state of the art problems:

Reduction of unnecessary paging reception—False Alarm
Paging reduction linked with RF capability/feature support
DRX/Paging cycle length adaptation
Transition from paging reduction to normal paging and vice versa
Reducing monitoring of multiple beams for paging message reception To further clarify the advantages and features of the present invention, a more particular description of the invention will be rendered by reference to specific embodiments thereof, which is illustrated in the appended drawing. It is appreciated that these drawings depict only typical embodiments of the invention and are therefore not to be considered limiting its scope. The invention will be described and explained with additional specificity and detail with the accompanying drawings.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

Figure 1:
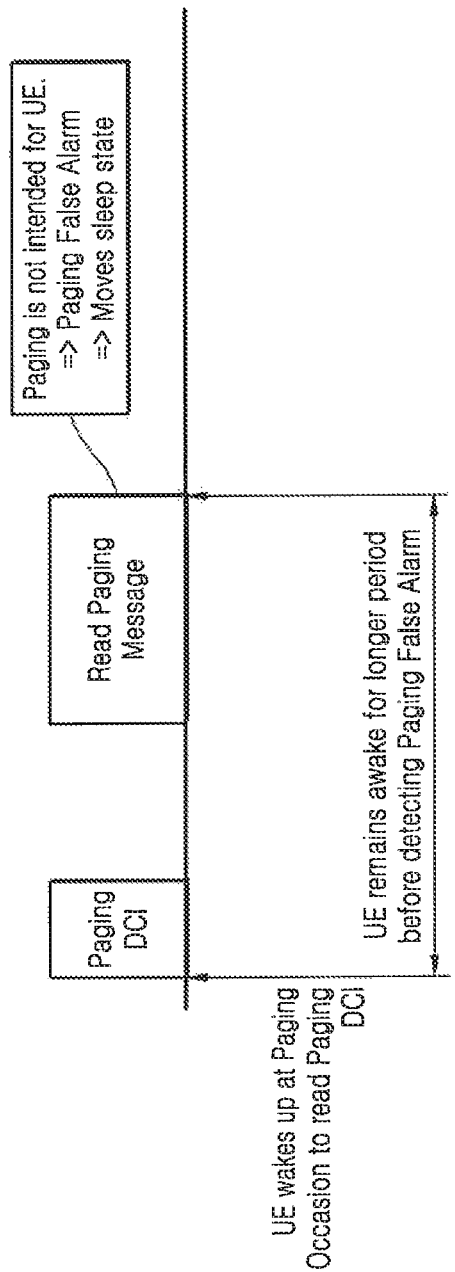
FIG. 1 illustrates legacy approach for paging in a wireless communication system, in accordance with existing art.

Further, skilled artisans will appreciate that elements in the drawings are illustrated for simplicity and may not have been necessarily drawn to scale. For example, the flow charts illustrate the method in terms of the most prominent steps involved to help to improve understanding of aspects of the present invention. Furthermore, in terms of the construction of the device/entity, one or more components of the device/entity may have been represented in the drawings by conventional symbols, and the drawings may show only those specific details that are pertinent to understanding the embodiments of the present invention so as not to obscure the drawings with details that will be readily apparent to those of ordinary skill in the art having benefit of the description herein.

DETAILED DESCRIPTION

For the purpose of promoting an understanding of the principles of the invention, specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates. Unless otherwise defined, all technical and scientific terms used herein have the same meaning as commonly understood by one of ordinary skilled in the art to which this invention belongs. The system, methods, and examples provided herein are illustrative only and not intended to be limiting.

The term "some" as used herein is defined as "none, or one, or more than one, or all." Accordingly, the terms "none," "one," "more than one," "more than one, but not all" or "all" would all fall under the definition of "some." The term "some embodiments" may refer to no embodiments or to one embodiment or to several embodiments or to all embodiments. Accordingly, the term "some embodiments" is defined as meaning "no embodiment, or one embodiment, or more than one embodiment, or all embodiments."

The terminology and structure employed herein is for describing, teaching and illuminating some embodiments and their specific features and elements and does not limit, restrict or reduce the spirit and scope of the claims or their equivalents.

More specifically, any terms used herein such as but not limited to "includes," "comprises," "has," "consists," and grammatical variants thereof do NOT specify an exact limitation or restriction and certainly do NOT exclude the possible addition of one or more features or elements, unless otherwise stated, and furthermore must NOT be taken to exclude the possible removal of one or more of the listed features and elements, unless otherwise stated with the limiting language "MUST comprise" or "NEEDS TO include."

Whether or not a certain feature or element was limited to being used only once, either way it may still be referred to as "one or more features" or "one or more elements" or "at least one feature" or "at least one element." Furthermore, the use of the terms "one or more" or "at least one" feature or element do NOT preclude there being none of that feature or element, unless otherwise specified by limiting language such as "there NEEDS to be one or more . . . " or "one or more element is REQUIRED."

Unless otherwise defined, all terms, and especially any technical and/or scientific terms, used herein may be taken to have the same meaning as commonly understood by one having an ordinary skill in the art.

It should be noted that the terms "network" and "network entity" have been interchangeably used throughout the description.

Figure 2:
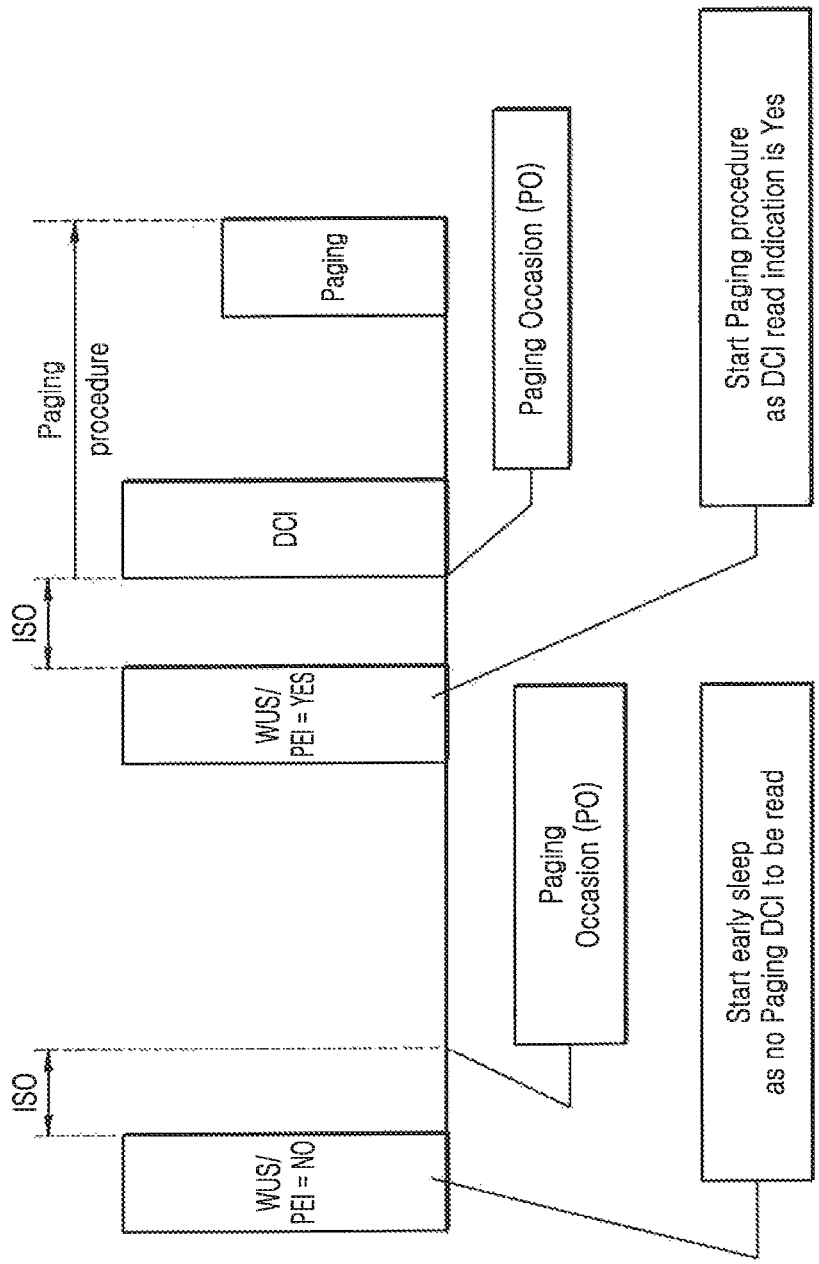
FIG. 2 illustrate approach for paging in a wireless communication system, in accordance with an embodiment of the present disclosure.

An UE in idle/inactive mode calculates its Paging Occasion (PO) and Paging Frame (PF) based on its UE ID and N. The UE ID: is 5G-S-TMSI mod 1024 and N: number of total paging frames in T. Based on the PO and PF, UE monitors PDCCH to read paging DCI (DCI format 1_0 with CRC scrambled by P-RNTI) and further reads the paging message. UE decides if the paging message is intended for it only after reading the actual paging message. All other UEs discard the paging message as a False Alarm. This way, a group of UEs (paging group) reads PDCCH and further paging message based on respective UE_ID and N on the same PO and PF. However, reception of paging messages in idle/inactive state invokes the UE to come out of the sleep mode and increases its power consumption. The present disclosure provides a solution which reduces the power consumption of a user equipment in idle/inactive states with respect to reception of paging messages. According to an embodiment of the present disclosure, an indication signal based paging DCI decoding is proposed. As shown in FIG. 2, according to said embodiment, the indicating signal before the paging occasion (PO) is provided to reduce such False Alarm. The indicating signal is at least one of a paging early indication (PEI) and a paging wake-up signal (WUS). The indicating signal may indicate presence or absence of paging DCI for the UE in PO.

Various embodiments of the present disclosure will be described below in detail.

FIGS. 3A, 3B, 4A and 4B illustrates methods for reducing paging in a wireless communication system. It should be noted that the method 300 illustrated in FIG. 3A may be performed by a network entity and the method 400 illustrated in FIG. 4A may be performed by a user equipment. In an embodiment of the present disclosure, the network entity may be a base station such as gNB, eNB, WIFI Access Point or a core network entity such as AMF, UPF or a combination thereof. The user equipment may be a mobile device, computer, laptop, personal digital assistance (PDA), a vehicle with communication facility or any similar device capable of communicating using wireless communication.

Figure 3A:
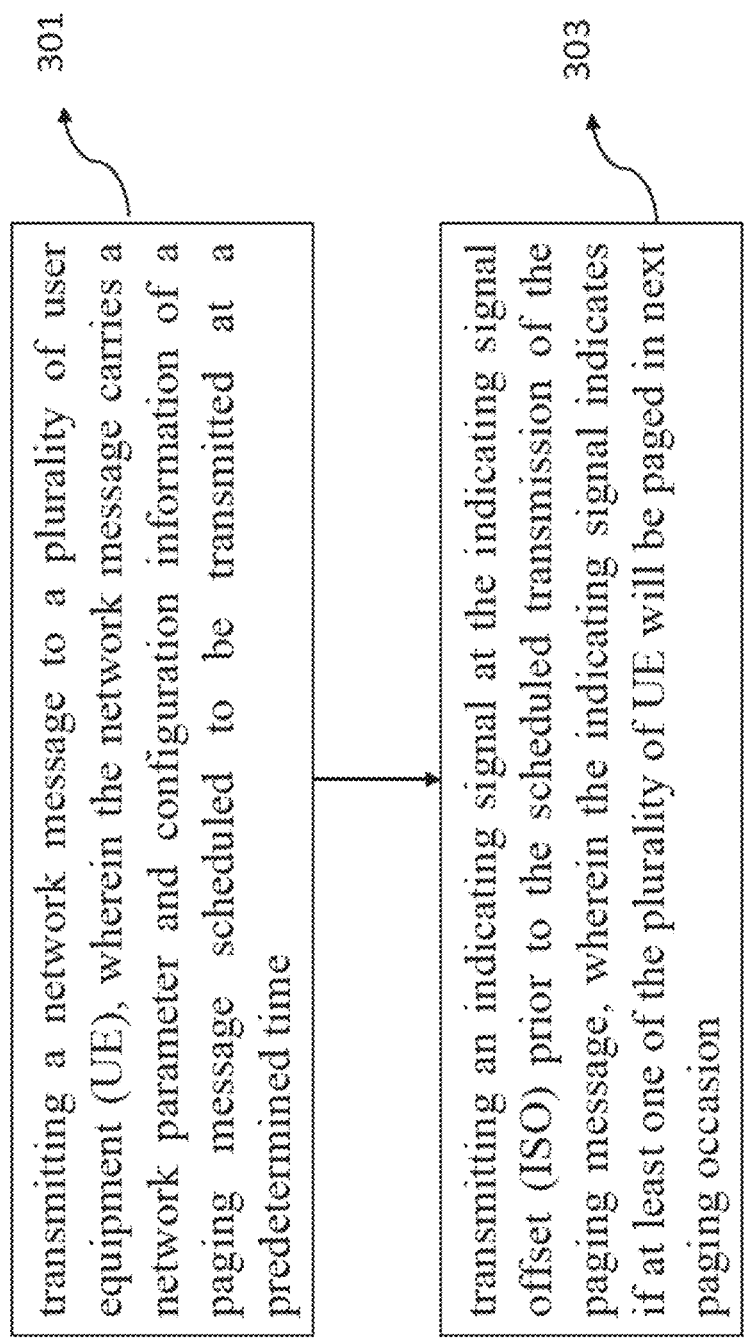
FIG. 3A illustrates a flow chart depicting a method for reducing paging in a wireless communication, in accordance with an embodiment of the present disclosure.

As shown in FIG. 3A, at step 301, the network entity may transmit a network message to a plurality of user equipment (UE). In an embodiment, the network message may carry a network parameter and configuration information of a paging message which is scheduled to be transmitted at a predetermined time According to an embodiment of the present disclosure, the configuration information includes a paging cycle, a paging frame (PF), a paging occasion (PO), a paging offset, a number of paging sub-groups in the cell (Nps), an indicating signal offset (ISO) and paging sub-groups information. Paging sub-groups information conveys to the UE whether the paging sub-group identity will be provided to UE by network with RRC and/or NAS signaling, and/or paging sub-group identity will be determined by the UE using a pre-specified formula. The ISO may be set at time which is before the predetermined time of the paging message. For example, if the paging message is scheduled to be transmitted at time t1, then the ISO may be set as t1-Δ, wherein Δ is an offset value. According to an embodiment, the value of Δ may be fixed for a paging cycle in a cell of the network. According to another embodiment, the value of Δ may vary in the paging cycle at different time instances. According to another embodiment, the value of Δ may be configured by the network and may be also different for different UEs and/or different paging sub-groups.

After transmitting the network message, the network entity, at step 305, may transmit an indicating signal at the indicating signal offset (ISO) prior to the scheduled transmission of the paging message. The indicating signal is at least one of a paging early indication (PEI) and a paging wake-up signal (WUS). In an embodiment, the indicating signal may indicate if at least one of the plurality of UE will be paged in next paging occasion. In particular, the indicating signal may indicate presence or absence of a paging DCI. In other words, the indicating signal enables the UE to determine if the upcoming paging message is meant for that UE or not. In another embodiment, the indicating signal indicates if at least one of the plurality of paging sub-groups will be paged in next paging occasion or not.

Figure 3B:
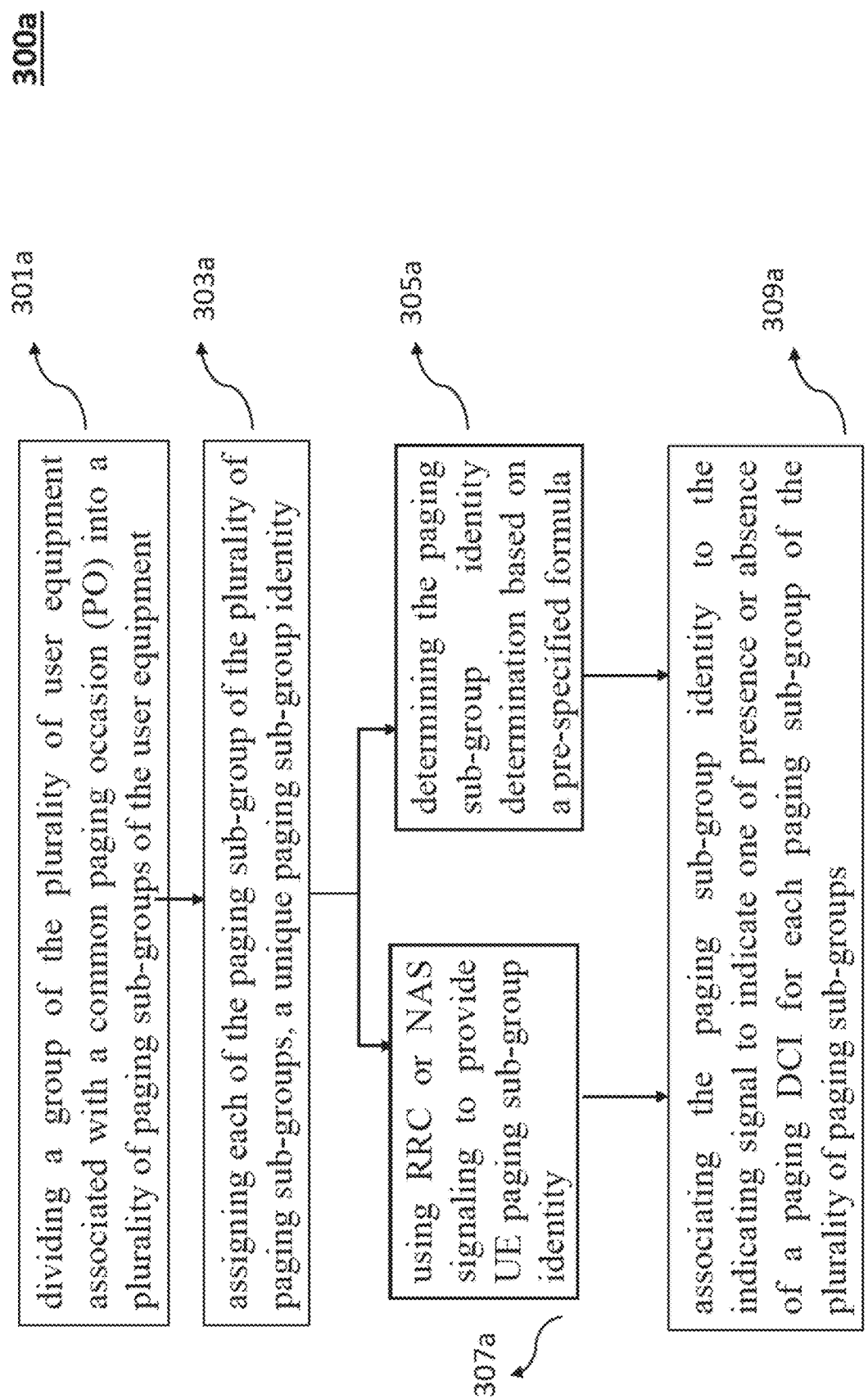
FIG. 3B illustrates depicting a method for assigning of paging sub-group identity to the user equipment, in accordance with an embodiment of the present disclosure.

FIG. 3B illustrates division of plurality of UEs in a plurality of paging sub-groups and assignment of paging sub-group identity to the paging sub-group. According to an embodiment of the present disclosure, the network entity may divide (301a) a group of the plurality of user equipment which are associated with a common paging occasion (PO), into a plurality of paging sub-groups of the user equipment. The grouping can be done as a subset (paging-sub-group) of the UEs belonging to the paging group that can be paged during the PO. The network entity then may assign (303a) each of the paging sub-group of the plurality of paging sub-groups, a unique paging sub-group identity. In an embodiment, the network entity may either determine (305a) the paging sub-group identity determination based on a pre-specified formula or may provide (305a) the paging sub-group identity to the UE using RRC or NAS signaling. the network entity may associate (309a) the paging sub-group identity to the indicating signal to indicate one of presence or absence of a paging DCI for each paging sub-group of the plurality of paging sub-groups. The network entity may transmit the indicating signal to the paging sub-groups.

According to an embodiment of the present invention, the indication signal may be a paging wakeup signal (WUS) or a paging early indication (PEI) signal. In one embodiment of the present disclosure, WUS or WUS like signal is used for Paging-DCI reception as well. i.e. WUS in idle/inactive mode (termed as Paging Wakeup Signal (WUS)) for monitoring Paging DCI may be used. The proposed low power consuming WUS signal is transmitted at the ISO (WUS-offset or PagingEarlyIndication-offset) before the PO of the UE. The WUS/PEI is transmitted by the network entity in the same CORESET where paging message is transmitted (e.g. CORESET0). The WUS/PEI indicates the presence or absence of paging DCI in the PO for a single/or a paging sub-group of UEs. The UE moves directly to sleep state, if WUS/PEI indicates no presence of paging DCI in the next PO for the UE.

According to another embodiment, a DCI signal in connected mode is enhanced and is configured in idle/inactive mode indicating presence or absence of the paging DCI in the PO for a single/or a paging sub-group identity of UEs.

According to another embodiment, a new paging indicating signal (e.g. new DCI based or other mechanism like introducing new low power consuming RF (Radio Frequency) sequence at UE) may be introduced for idle/inactive mode UEs for paging reception. Such DCI is scrambled with P-RNTI/PS-RNTI. In order to detect the proposed RF sequence, the UE may use a separate RF or same RF circuitry as used for normal communication. Additionally, in an embodiment the RF sequence or paging indicating signal may also be provided on at least one of same frequency, band, bandwidth part (BWP), power allocation or sub-carrier spacing than that is used for Idle/Inactive mode e.g. Initial BWP. In another embodiment the RF sequence or paging indicating signal may also be provided on at least one of different frequency, band, bandwidth part (BWP), power allocation or sub-carrier spacing than that is used for Idle/Inactive mode e.g. Initial BWP. The information about frequency, band, bandwidth part (BWP), power allocation or sub-carrier spacing is indicated in broadcast and/or RRC signalling message by the network entity. In absence of such information from network entity, the UE assumes same frequency, band, bandwidth part (BWP), power allocation or sub-carrier spacing to be used for Idle/Inactive mode e.g. Initial BWP. The presence, sequence or pattern of the RF sequence may indicate the presence or absence of paging for an UE or paging-sub-group identity of UEs.

According to another embodiment, the indicating signal may be reference signal which is configured to indicate the presence or absence of paging DCI in the PO for at least one of a single UE or a paging sub-group identity of UEs. In a further embodiment, the reference signal may be an enhanced channel state indicator reference signal (CSI-RS), a tracking reference signal (TRS), a secondary synchronization signal (SSS) and a demodulation reference signal (DMRS) like signal which are configured in idle/inactive state to indicate the presence or absence of paging for an UE or paging-sub-group or group of UEs. These reference signals may also possibly be provided either on at least one of same frequency, band, bandwidth part (BWP), power allocation and/or sub-carrier spacing than that is used for Idle/Inactive mode e.g. Initial BWP. In another embodiment the reference signal may also be provided on at least one of different frequency, band, bandwidth part (BWP), power allocation or sub-carrier spacing than that is used for Idle/Inactive mode e.g. Initial BWP. The information about frequency, band, bandwidth part (BWP), power allocation or sub-carrier spacing is indicated in broadcast and/or RRC signalling message by the network entity. In absence of such information from network entity, the UE assumes same frequency, band, bandwidth part (BWP), power allocation or sub-carrier spacing to be used for Idle/Inactive mode e.g. Initial BWP. These signals are provided at a configurable offset to the PO. Their presence, sequence and/or pattern indicate the presence or absence of paging message for one or more UEs/or for a paging sub-group identity of UEs.

In another embodiment of the present disclosure, such indicating signals may carry paging-sub-group IDs using DCI to indicate the sub-group identity or identities of the paging messages received in associated PO. In an embodiment, the DCI signal may comprise a bitmap including a plurality of bits. In other words, such indication can be in the form of a bitmap as shown in below example:

Bitmap: 01101101

Option 1—LSB indicating first paging-sub-group-id: Paging-sub-group IDs present in the next PO: paging-sub-group-id0, paging-sub-group-id2, paging-sub-group-id3, paging-sub-group-id5 and paging-sub-group-id6

Option 2—MSB indicating first paging-sub-group-id: Paging-sub-group IDs present in the next PO: paging-sub-group-id1, paging-sub-group-id2, paging-sub-group-id4, paging-sub-group-id5 and paging-sub-group-id7

A bit, in the proposed bitmap, when set to 1 represents presence of paging for a specific paging-sub-group and when set 0, it indicates absence of paging for the paging-sub-group. Further, reverse interpretation of bit may also be applied.

According to another embodiment of the present disclosure, the network entity may configure N bytes of Bitmap depending on the number of configured paging-sub-groups (Nps) where N is related to Nps such that N=CEIL (Nps/8). E.g. if Nps is 20=>NW may use up to 3 bytes to indicate paging-sub-group in bitmap form.

In another embodiment of the present disclosure, the network entity may indicate the starting (pagingSubGroup-Start) and number (pagingSubGroupNum) of paging-sub-group IDs in associated PO to include pagingSubGroupNum consecutive paging-sub-group IDs. E.g. pagingSubGroup-Start=4 and pagingSubGroupNum=3, paging-sub-group-id4~ paging-sub-group-id6 would be present in subsequent PO.

According to another embodiment of the present disclosure, the UE may determine its own paging-sub-group-id as function of UE_ID, N, Ns and Nps. Accordingly, the UE may further read the paging DCI at PO only if its own paging-sub-group-id is indicated in the indicating signal. The calculation of UE's own paging sub-group ID is as mentioned in the subsequent embodiment of the present disclosure.

Another embodiment of the present disclosure proposes explicitly including the UE ID in the paging DCI. However, this seems overkill and it seems hard to accommodate in paging DCI given limited number of reserved bits are available. In one embodiment of the present disclosure, the UE ID is incorporated in the paging DCI to reduce False Alarm. Alternatively, in another embodiment of the present disclosure, a new DCI is introduced to incorporate paging UE ID for one or more UEs.

Further, the present disclosure proposes a UE_ID based paging-sub-group. The proposed embodiment is implemented in following steps:

Step 1: A default table/system information broadcast/ RRC/NAS signaling based paging-sub-group to UE_ID mapping table (paging-sub-group-table) is configured by the network entity. Below is a simple example of such paging-sub-group-table:

| | |
|---|---|
| paging-sub-group-id0 | UE_ID0, UE_ID1...UE_ID199 |
| paging-sub-group-id1 | UE_ID200, UE_ID201...UE_ID399 |
| paging-sub-group-id2 | UE_ID400, UE_ID401...UE_ID599 |
| paging-sub-group-id3 | UE_ID60, UE_ID701...UE_ID799 |
| paging-sub-group-id4 | UE_ID800, UE_ID801...UE_ID1023 |

The above table is just an indicative table and the network entity can use its own implementation to accommodate the UEs based on UE_ID, Idle DRX configuration, paging grouping mechanism being used etc. In an embodiment, the network entity may transmit the paging sub-group ID to the UE using at least one of a radio resource control (RRC) signalling and a non-access stratum (NAS) signalling.

Step 2: The paging-sub-group can be indicated by adding one or more paging-sub-group-id in paging DCI. Below options (one or combination of) are proposed to include UE_ID based paging-sub-group through DCI:

Option 1: Utilizing the reserved bits in DCI format 1_0 (paging DCI) to indicate the row_index in the configured paging-sub-group-table and is indicated in a bitmap format.

Option 2: a new paging DCI is introduced to indicate the UE_ID/row_index-based paging-sub-group.

Step 3: A UE, on reception of paging DCI, checks if the paging-sub-group-id received in paging DCI indicates the UE_ID according to the configured paging-sub-group-table. If UE_ID is indicated according to the paging DCI and the configured paging-sub-group-table, UE proceed for further paging message reception, else move to sleep mode.

Further in the embodiment, the Legacy DCI format 1_0 for P-RNTI is described below. The following information is transmitted by means of the DCI format 1_0 with CRC scrambled by P-RNTI:

Short Messages Indicator—2 bits according to Table 7.3.1.2.1-1.

Short Messages—8 bits, according to Clause 6.5 of [9, TS38.331]. If only the scheduling information for Paging is carried, this bit field is reserved.

Frequency domain resource assignment—bits. If only the short message is carried, this bit field is reserved.

is the size of CORESET 0

Time domain resource assignment—4 bits as defined in Clause 5.1.2.1 of [6, TS38.214]. If only the short message is carried, this bit field is reserved.

VRB-to-PRB mapping—1 bit according to Table 7.3.1.2.2-5. If only the short message is carried, this bit field is reserved.

Modulation and coding scheme—5 bits as defined in Clause 5.1.3 of [6, TS38.214], using Table 5.1.3.1-1. If only the short message is carried, this bit field is reserved.

TB scaling—2 bits as defined in Clause 5.1.3.2 of [6, TS38.214]. If only the short message is carried, this bit field is reserved.

Reserved bits—8 bits for operation in a cell with shared spectrum channel access; otherwise 6 bits.

As proposed in present solution, the reserved bits in DCI format 1_0 may be conditionally used for indicating the paging-sub-group information field in a bitmap format. A bit when set to 1 represents presence of paging for a specific paging-sub-group and when set 0, it indicates absence of paging for the paging-sub-group. Further, reverse interpretation of bit may also be applied. Further, the paging-sub-group information field is only interpreted by UEs supporting paging reduction feature and otherwise, remain reserved. The Legacy UEs and Release 17 UEs, which do not support paging reduction feature, would ignore paging-sub-group information field in DCI format 1_0 and proceed for paging message reception as per legacy mechanism.

The number of paging-sub-group(s) can be configurable parameter by network. The same can be deduced based on networks paging loading and group configurations. The maximum number of paging-sub-group(s) supported given by the limited number of reserved bits in DCI and/or may be configured by network In one embodiment of the present disclosure, new information field indicating presence or absence of paging message for only a sub-set of UEs in the specific PO is proposed. A new field paging-sub-group information is introduced in existing DCI format 1_0 for P-RNTI to indicate presence or absence of paging message for specific paging-sub-group(s) in a bitmap format. E.g. bit 0 corresponds to first paging-sub-group, bit 1 corresponds to second paging-sub-group and so on. Field maps to existing reserved bits in DCI format 1_0 and is used conditionally i.e. only when paging reduction feature is enabled by network. The number of paging-sub-group(s) can be configurable parameter by network. The maximum number of paging-sub-group(s) supported is decided given the limited number of reserved bits in DCI.

Another solution proposed by the present disclosure is defined by implicit paging-sub-group indication based on UE_ID and other paging parameters. UE may know from the "paging sub-group information" from network message that it has to determine its paging sub-group identity based on the pre-specified formula and network may not provide sub-group identity to the UE through RRC and/or NAS signalling. Said solution avoids such false alarm by introducing paging-sub-group under each paging group. The network entity may transmit 'K' paging-sub-group IDs. UE calculates PO and PF according to existing mechanism and reads indicating signal. The indicating signal (e.g. DCI or reference signal) indicates applicable paging-sub-group(s). UEs belonging to these sub-groups only read further Paging Message. The embodiment of the present disclosure explains how the UE deduce its own paging-sub-group. The possible formulation is explained as:

The PF and PO for paging are determined by the following formulae:

Single Frequency Network (SFN) for the PF is determined by:

$$(SFN+PF\_offset) \bmod T = (T \text{ div } N)*(UE\_ID \bmod N)$$

Index (i_s), indicating the index of the PO is determined by:

$$i\_s = \text{floor } (UE\_ID/N) \bmod Ns$$

The following parameters are used for the calculation of PF and i_s above:
T: Discontinuous Reception (DRX) cycle of the UE
N: number of total paging frames in T
Ns: number of paging occasions for a PF
PF_offset: offset used for PF determination UE_ID: 5G-S-TMSI mod 1024

According to the embodiment of the present disclosure, the UE determines its paging-sub-group as function of UE_ID, N, Ns and Nps. The same can be explained below by way of non-limiting examples.

Example 1: paging sub_group ID=floor (UE_ID/(N*Ns)) mod Nps

Example 2: paging_sub_group ID=floor (UE_ID/(Ns)) mod Nps, where Nps—Number of paging-sub-groups as configured by network as proposed by the present disclosure.

In an embodiment, the network entity may indicate to the UE if it is transmitting the paging sub-group ID or the UE has to determine its paging sub-group ID, using the paging sub-groups information.

In an embodiment, the network entity may transmit the paging sub-group ID to the UE using at least one of a radio resource control (RRC) signalling and a non-access stratum (NAS) signalling. The indicating signal indicates if at least one of the plurality of paging sub-groups will be paged in next paging occasion or not. UE decodes the indicating signal to determine if the paging sub-group identity for the UE will be paged in the paging occasion based on the indicating signal; and enter by the UE, in a sleep mode upon determination that paging sub-group identity for the UE will not be paged in next paging occasion.

In an embodiment, network entities communicate and transfer the paging sub-group identity of the UE when UE is performing cell reselection, mobility or registration etc. For example, on handover of the UE, source gNB provides the paging sub-group identity of the UE to the target gNB. Further, AMF entity in the core network can provide the paging sub-group identity for the UE to the serving gNB.

In another embodiment, a simultaneous use of network provided paging sub-group identity for a set of UEs in the cell and formula based determination by UE of paging sub-group identity for another set of UEs in the same cell can be utilized.

In another embodiment, same paging sub-group identity for a set of UEs in the cell is applicable of these UEs being in idle and/or inactive state and/or their transitions across idle and inactive states. That is to say, Core Network (CN) Paging and Radio Access Network (RAN) paging follows same paging sub-group identity and approaches e.g. formula based and/or network signalling i.e. RRC or NAS signalling based determination of paging sub-group identity. For inactive state of the UE, AMF provides the paging sub-group identity information of the UE to the gNB to perform RAN paging.

In another embodiment, when UE is assigned a new UE identity e.g. when UE does cell reselection, registration procedure, or GUTI reassignment happens for UE etc., UE re-determines the paging sub-group identity with the formula approach by using the newly assigned UE identity.

In an embodiment, the network entity may determine the paging if it supports the paging reduction feature. In particular, the network entity determines if it supports transmitting the indicating signal.

Further, the present disclosure provides solution where there is paging reduction linked with RF capability/feature support. In many scenarios, UE would like to adopt paging reduction feature subject to conditions on what all features it supports in general or is actively pursuing at the specific time e.g. a UE supporting DSDS (Dual SIM Dual Standby, where dual protocol stacks or SIMs are supported using a common RF) operation may not be desirable to support paging reduction. Also, RF capability of the UE could determine whether UE applies paging reduction or not e.g. robust reception of paging reception is linked with RF capability of the UE. IN other words, the UE may determine if it supports receiving the indicating signal from the network entity. Therefore, it seems pertinent that choice for paging reduction application lies with UE and it should be able to exercise it semi-statistically (capability information) or dynamically (signaling). Though, the UE can express dynamically the choice for paging reduction in connected mode only and therefore, would require UE to come to connected mode to share the status for paging reduction support. The UE indicates its capability for supporting paging reduction feature with a capability bit in UE capability information message or UE can indicate its preference or priority for paging reduction with an UE assistance information message.

UE adopts paging reduction subject to its RF capability and/or features support requirements.

UE signals support for paging reduction to network semi-statically (capability information) and/or dynamically.

UE indicates its capability for supporting paging reduction feature with a capability bit in UE capability information message or UE can indicates its preference or priority for paging reduction with an UE assistance information message.

Another proposed embodiment pertains to DRX/Paging cycle length adaptation. In legacy systems, the UE utilizes Tracking Area Update (TAU) signaling to convey its preferred paging cycle length (UE specific DRX) to the network. However, such approach can only facilitate UE to adopt aggressive DRX cycles i.e. smaller than cell specific DRX cycle. One possibility is to extend the approach to indicate preference for paging reduction and/or longer DRX cycle length to the network. Consequently, an adaptation for DRX/Paging cycle length (e.g. RAN paging cycle, CN paging cycle) is achievable dynamically. Such indication by the UE is dynamically controlled by the network (e.g. gNB, AMF) based on DCI or Broadcast Message/RRC messages/NAS message/MAC CE.

Figure 7:
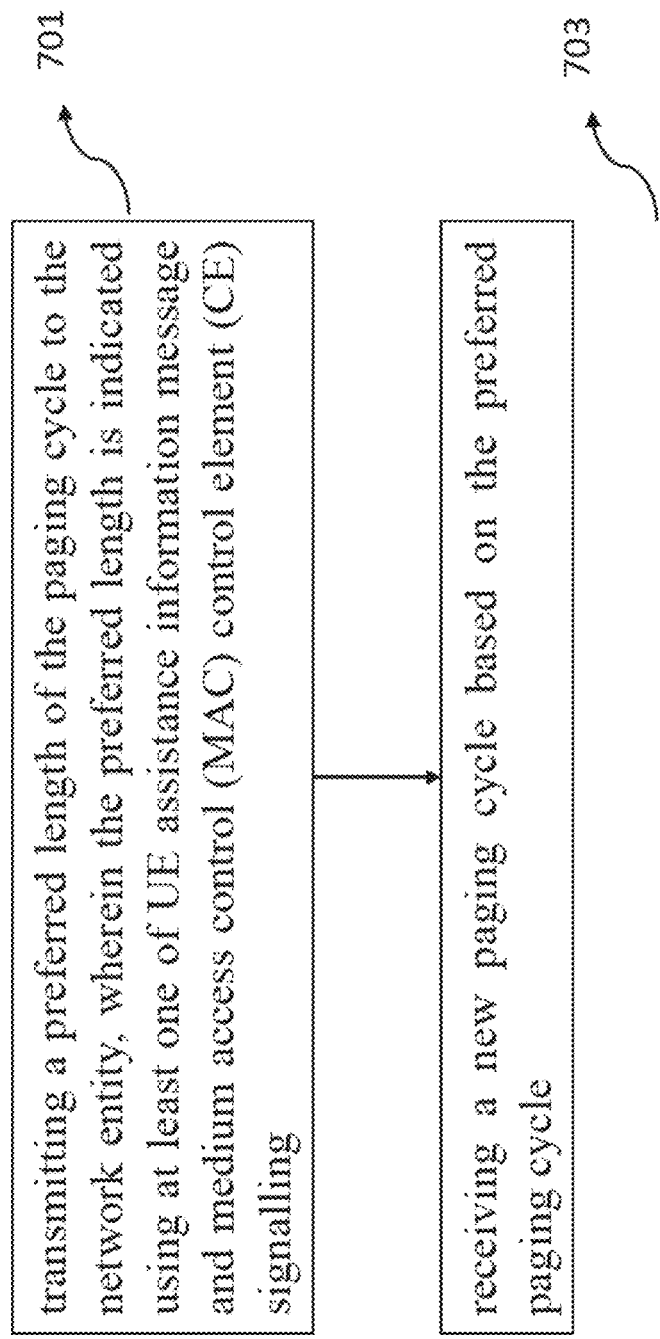
FIG. 7 illustrates dynamic adaption of paging cycle, according to an embodiment of the present disclosure.

In an embodiment, the dynamic adaptation of paging cycle length is supported, as shown in FIG. 7. In particular, the UE may transmit (701) a preferred length of the paging cycle to the network entity, wherein the preferred length is indicated using at least one of UE assistance information message and medium access control (MAC) control element (CE) signalling. The network entity may configure a new paging cycle based on the preferred paging cycle received from the user equipment, using at least one of the DCI, medium access control (MAC) control element (CE), broadcast signalling like SIB, and RRC signalling and NAS signalling transmit (703) the new paging cycle to the UE. Accordingly, dynamic adaptation of paging cycle is supported, and UE utilizes UE assistance information message to indicate preferred paging cycle length. In another approach, preferred paging cycle length is conveyed through MAC Control Element (CE) to the network.

The legacy approach of the present disclosure for UE specific DRX can be considered and extended to indicate preference for paging reduction and/or longer paging cycle length to the network.

In another embodiment of the present invention, dynamic adaptation of paging cycle length is achieved through below procedure:

The network configures "N" paging-DRX-configuration with different values (e.g. T, N, Ns)

The network dynamically indicates UE to use one of the paging-DRX-configuration from those preconfigured values using WUS.

Figure 4A:
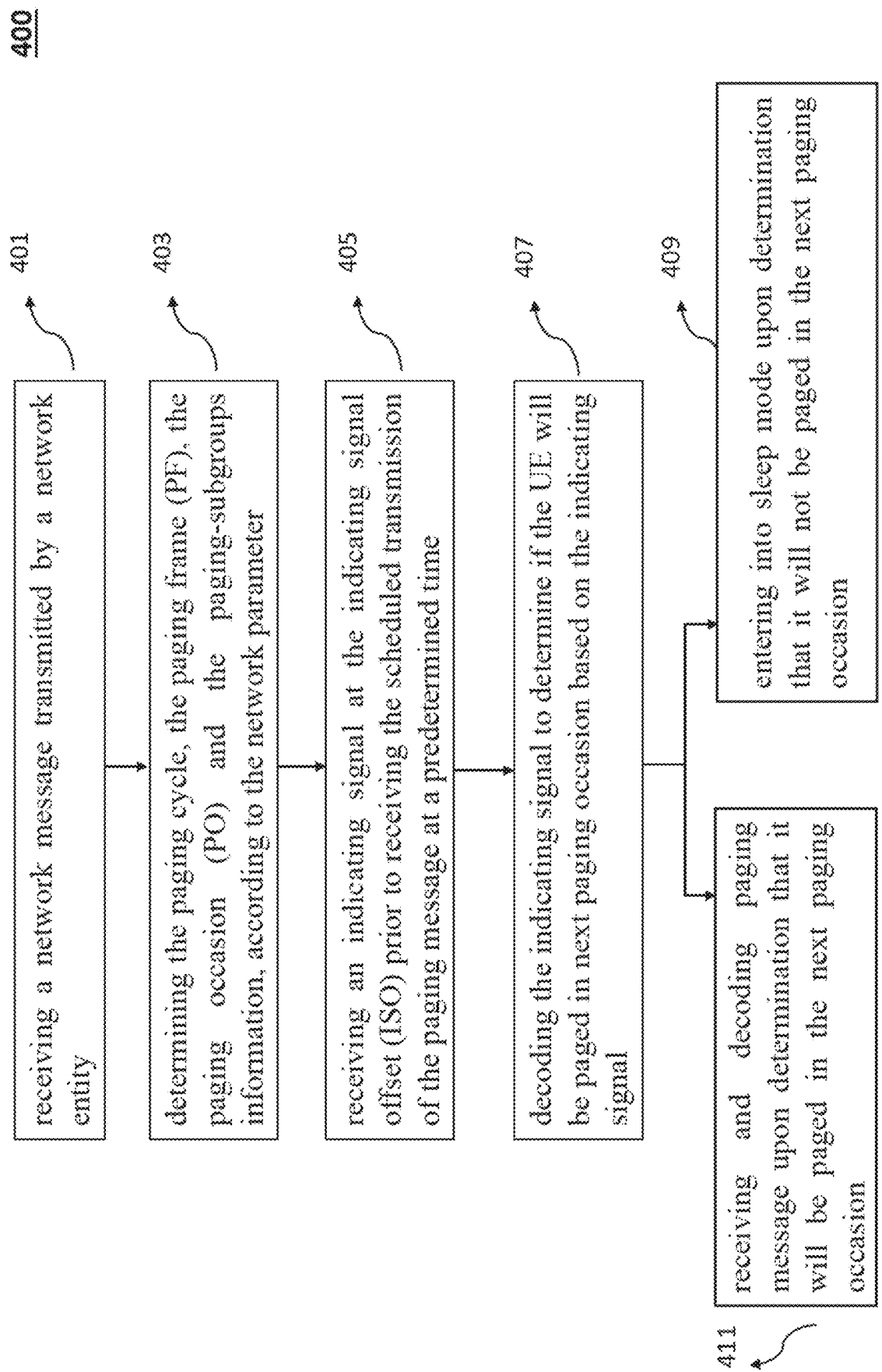
FIG. 4A illustrates a flow chart depicting a method for reducing paging in a wireless communication, in accordance with an embodiment of the present disclosure.

FIG. 4A illustrates a method (400) for reducing paging in a wireless communication system from UE perspective, in accordance with an embodiment of the present disclosure. As shown in FIG. 4A, at step 401, the UE receives a network message transmitted by a network entity. Thereafter, at step 403, the UE determines the paging cycle, the paging frame (PF), the paging occasion (PO) and the paging-subgroups information, from the network message according to the network parameter. Then, at step 405, the UE receives an indicating signal at the indicating signal offset (ISO) prior to receiving the scheduled transmission of the paging message at a predetermined time and decodes the indicating signal to determine if the UE will be paged in next paging occasion based on the indicating signal, at step 407. Then, at step 409, the UE enters in a sleep mode upon determination that it will not be paged in the next paging occasion. On the other hand, if UE determines that it will be paged in the paging occasion, then at step 411, the UE may receive and decode the paging message.

Figure 4B:
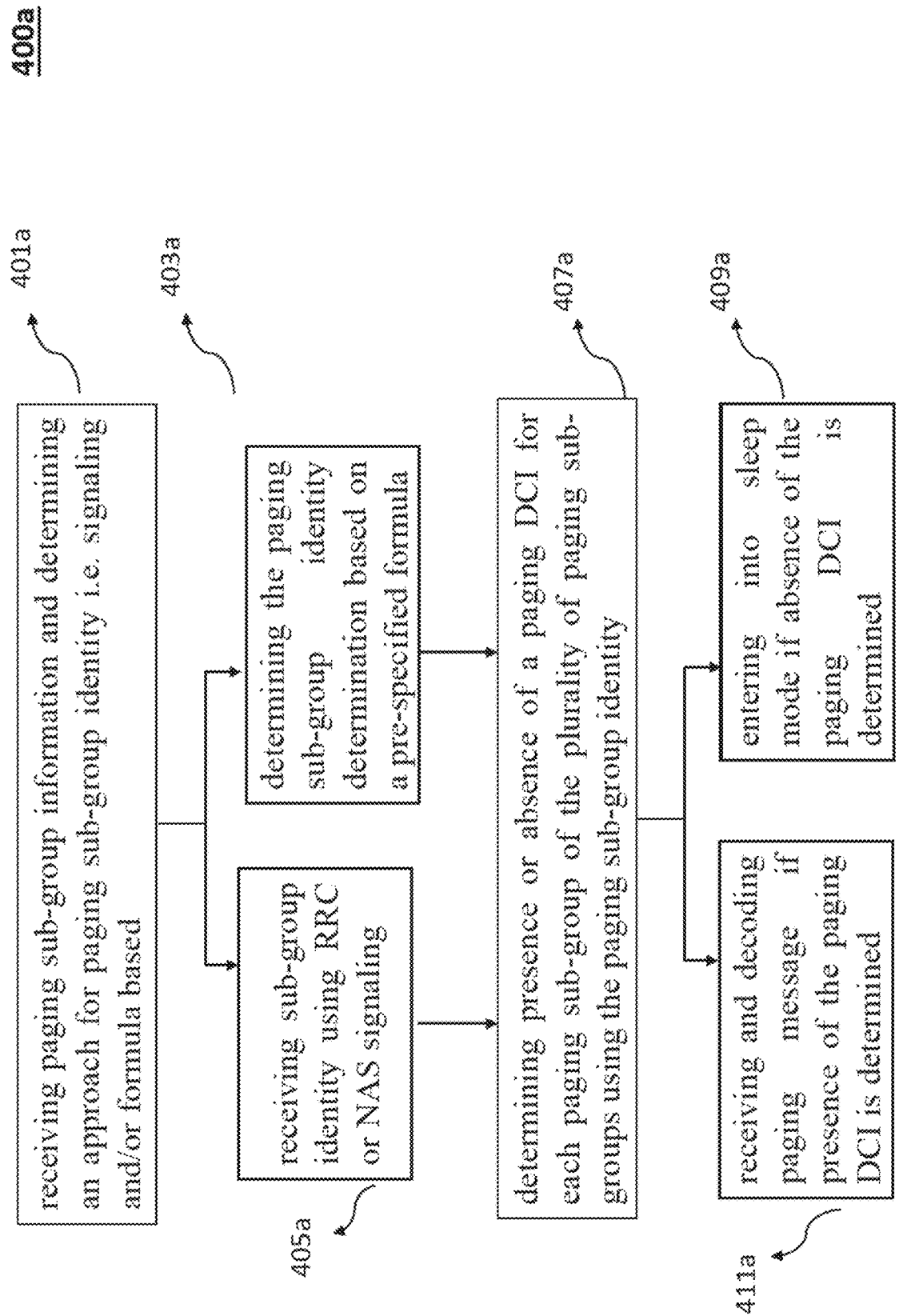
FIG. 4B illustrates depicting a method for determining paging sub-group identity by the user equipment, in accordance with an embodiment of the present disclosure.

Further, as shown in FIG. 4B, the UE may receive (401a) the paging sub-group information and determine an approach to determine paging sub-group identity i.e. either through RRC/NAS signaling and/or using a prespecified formula. If the paging sub-group information indicates that the paging sub-group identity will be determined using a pre-specified formula, then, the UE determines (403a) the paging sub-group identity using the pre-specified formula. The details of the pre-specified formula are discussed later. On the other hand, if the paging sub-group information indicates that the paging sub-group identity will be transmitted by the network entity, then the UE determines (405a) the paging sub-group identity from the signal received from the network entity using RRC/NAS signalling. Thereafter, the UE determines (407a) presence or absence of a paging DCI for each paging sub-group of the plurality of paging sub-groups using the paging sub-group identity. Then, at step 409a, the UE enters in a sleep mode upon of the absence of a paging DCI. On the other hand, if the UE determines presence of the paging DCI, then at step 411a, the UE may receive and decode the paging message.

Thus, above mentioned proposed solution either individual or a combination of is used to reduce UE power consumption for idle/inactive UEs as part of paging reduction features:

Introducing paging-sub-group to reduce false paging alarms

Paging reduction linked with RF capability

Dynamic adaptation of paging cycle length

Below is an example of proposed DCI format termed as DCI_2_X(7) according to another embodiment:

Format DCI_2_X(7):

DCI format DCI_2_X(7) is used for notifying the paging-sub-group-ID.

The following information is transmitted by means of the DCI format 2_X(7) with CRC scrambled by P-RNTI/PS-RNTI:

Paging sub-group indicator block 1, Paging sub-group indicator block 2, . . . , Paging sub-group indicator block N.

Each Paging sub-group indicator block is 8 bits bitmap indicating presence or absence of up to 8 paging-sub-group-ID.

The size of DCI format 2_X(7) is configurable by higher layers parameter sizeDCI-2-X(7).

According to current embodiment, below are some of the configuration parameters indicated by the network entity in the network message to support the disclosed enhanced paging mechanism:

Enhanced-paging support—1bit: Indicating current cell supports enhanced paging mechanism ISO (PEI_offset/PagingWUS-offset)—an offset before Paging Occasion to indicate position of PEI or WUS.

Number of Paging-sub-groups—"x" bits: Indicating number of paging-sub-groups supported by the current cell.

Size of DCI 2_7 (X)—Indicating the size of the DCI_2_7 (X) to be used by the UE.

Figure 5:
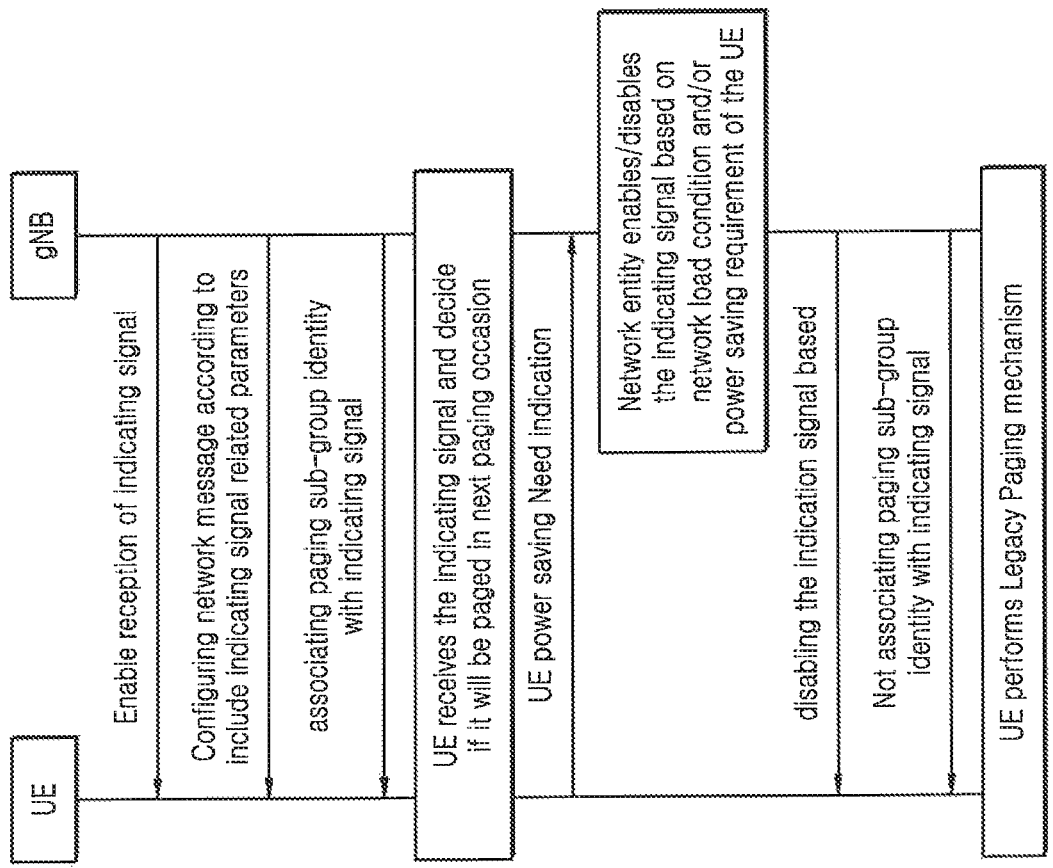
FIG. 5 illustrates transition between proposed paging reduction and existing paging, in accordance with an embodiment of the present disclosure.

Another embodiment of the present invention discloses transition from paging reduction to normal paging and vice versa, as shown in FIG. 5. Based on network load condition and UE power saving requirement under a specific paging group, transmission if the indicating signal may be dynamically enabled/disabled by the network entity. In such case, the network entity would stop including paging-sub-group information field in indicating signal. The UE operation is according to legacy 3GPP mechanism for paging reception in case of network has disabled the indicating signal. However, this needs to be signaled to the UEs. There are two suitable solutions to indicate the same:

Option 1: Broadcast signaling through SIB e.g. SIB1 carries paging reduction signaling in PCCH-Config with an additional field Paging-Reduction-Support or another existing SIB or a new SIB. Obviously, the field is not to be supported/read by legacy UEs. Absence of field indicates no support by network entity for paging reduction in the cell.

Option 2: Dynamically enable/disable paging reduction feature by introducing Paging-Reduction-Support field in RRC Connection Release/RRC Connection Suspend/Redirection message for a specific UE.

Network can enable/disable paging reduction support and indicate to the UEs.

Consider introducing Paging-Reduction-Support field in PCCH-Config as a common indication to all the UEs in a cell as well as in RRC Connection Release/RRC Connection Suspend/Redirection message for a UE specific indication.

Option 3: Network entity does not configure paging reduction related parameters e.g. 'Nps'—number of paging-sub-group IDs in the broadcast message thus indicating to fall back to legacy mechanism.

Figure 6:
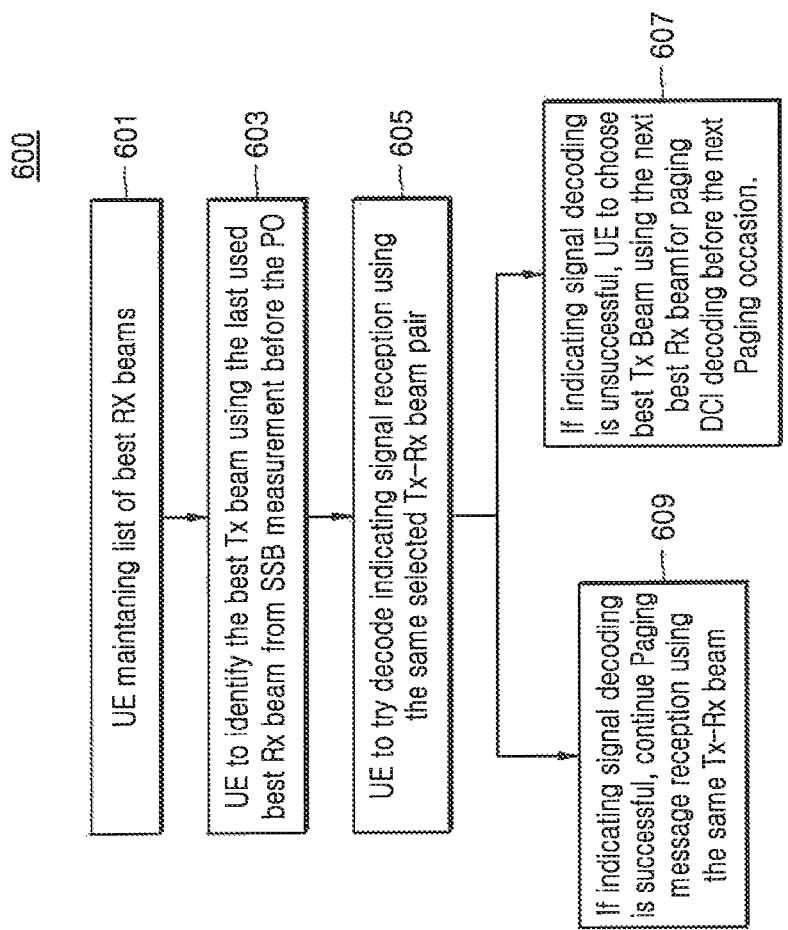
FIG. 6 illustrates multi-beam monitoring reduction, according to an embodiment of the present disclosure.

Further, yet another embodiment pertains to reduced monitoring of multiple beams for paging message reception, as shown in FIG. 6. According to existing prior-art, in multi-beam operations, UE can assume that the same paging message is repeated in all beams of the sweeping pattern and thus the selection of the beam(s) for the reception of the paging message is up to UE implementation. Below optimization mechanisms (one or in combination) are proposed to further reduce UE power consumption in this context:

Option 1: UE to provide reselection priority to FR1 cell during RRC_IDLE state than FR2 cell to reduce monitoring number of beams for paging reception.

Option 2: UE to indicate preferred frequency as FR1 in connected mode and reselect FR1 cell during RRC_IDLE state for monitoring a smaller number of SSB beams and paging messages. The UE power saving information can be transmitted using RRC message or MAC CE.

Option 3: UE to indicate preferred battery saving need information in connected mode and network to move UE to a FR1 cell during RRC_IDLE state for monitoring a smaller number of SSB beams and paging messages through RRC connection release/redirection.

Option 4: UE to indicate preferred battery saving need information before moving out of RRC connection state and network to move the UE to a cell supporting Paging-Reduction-Support mechanism as proposed in the current invention or otherwise, so that UE monitors less number of paging messages during idle/inactive state.

Option 5: UE to perform below steps for monitoring multiple beams related to paging reception:
  Step 0: UE to maintain list of best Rx beams according last camping history;
  Step 1: UE to identify the best Tx beam using the last used best Rx beam from SB measurement before the PO. If no history is available UE to choose a random Rx beam for the Tx beam selection;
  Step 2: UE to decode paging DCI reception using the selected Tx-Rx beam pair at step 1.
  Step 3A: If paging DCI decoding is successful, UE to continue with the Tx-Rx beam pair for further Paging message reception.
  Step 3B: If Paging DCI decoding fails (e.g. CRC error occurs), UE to choose best Tx Beam using the next best Rx beam for paging DCI decoding before the next PO. If no history is available, UE to choose a next random Rx beam for the Tx beam selection.

Hence, in an embodiment, the UE may select (603) a transmitting-receiving beam pair before the paging occasion, decode (605) at least one of the indicating signal and the paging message using the selected transmitting-receiving beam pair and select (607) a new transmitting-receiving beam pair if the decoding fails for at least one of the indicating signal and the paging message. On the other hand, if the decoding of the indicating signal is successful, the UE continues (609) with the selected transmitting-receiving beam pair.

Figure 8:
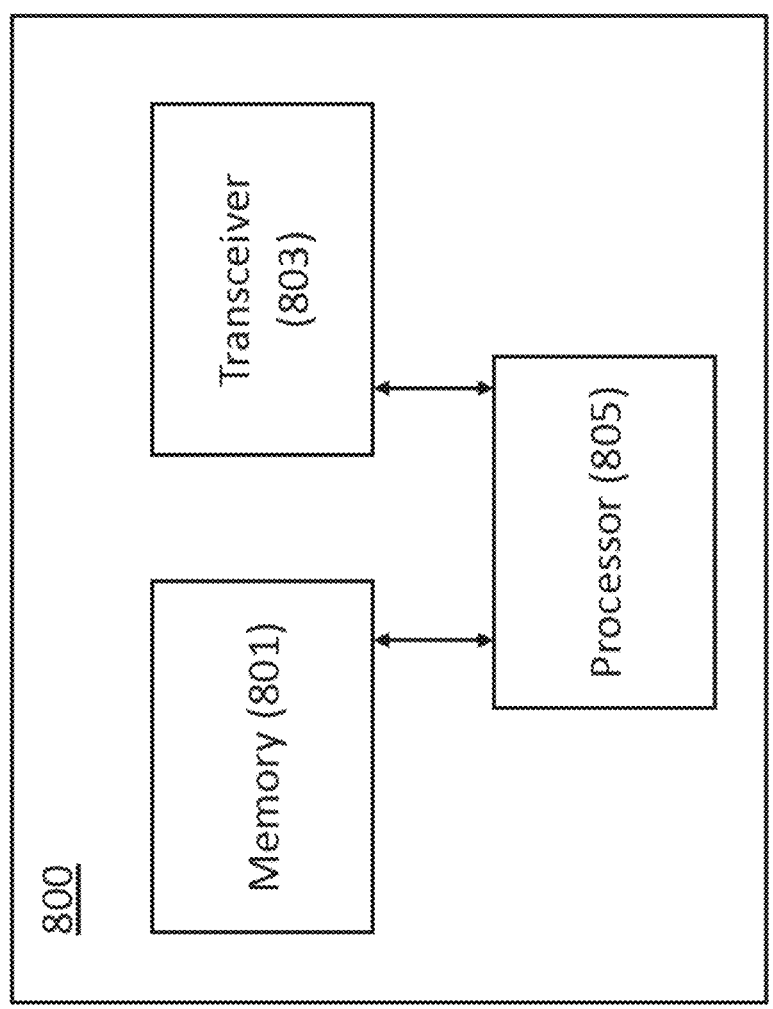
FIG. 8 illustrates a block diagram of a network entity for reducing paging in a wireless communication, in accordance with an embodiment of the present disclosure.

FIG. 8 illustrates a block diagram of a network entity for reducing paging in a wireless communication system, in accordance with an embodiment of the present disclosure. In an embodiment, the network entity 800 may comprise a memory 801, a processor 805, and a transceiver 803. The processor 805 is coupled to the memory 801 and the transceiver 803. In an embodiment of the present disclosure, the processor 803 may be configured to perform the method as discussed in respect to FIG. 3A. Moreover, the processor 803 may also be configured to perform the techniques discussed above.

Figure 9:
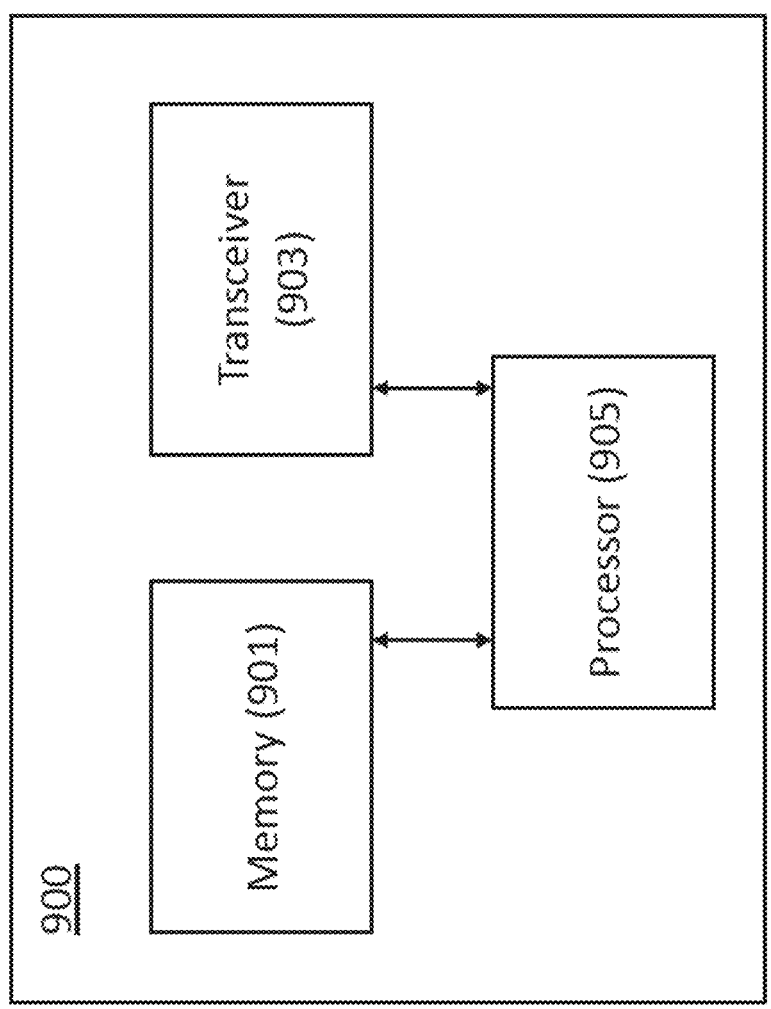
FIG. 9 illustrates a block diagram of a user equipment for reducing paging in a wireless communication, in accordance with an embodiment of the present disclosure.

FIG. 9 illustrates a block diagram of a user equipment for reducing paging in a wireless communication system, in accordance with an embodiment of the present disclosure. In an embodiment, the network entity 900 may comprise a memory 901, a processor 905, and a transceiver 903. The processor 905 is coupled to the memory 901 and the transceiver 903. In an embodiment of the present disclosure, the processor 903 may be configured to perform the method as discussed in respect to FIG. 3A. Moreover, the processor 903 may also be configured to perform the techniques discussed above.

In an exemplary embodiment, the processors 803, 903 may be a single processing unit or a number of units, all of which could include multiple computing units. The processors 803, 903 may be implemented as one or more microprocessors, microcomputers, microcontrollers, digital signal processors, central processing units, state machines, logic circuitries, and/or any devices that manipulate signals based on operational instructions. Among other capabilities, the processors 803, 903 may be configured to fetch and execute computer-readable instructions and data stored in the memory. The processors 803, 903 may include one or a plurality of processors. At this time, one or a plurality of processors may be a general-purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). One or a plurality of processors control the processing of the input data in accordance with a predefined operating rule or artificial intelligence (AI) model stored in the non-volatile memory and the volatile memory 801, 901. The predefined operating rule or artificial intelligence model is provided through training or learning.

In an embodiment, the memory 801, 901 may include any non-transitory computer-readable medium known in the art including, for example, volatile memory, such as static random-access memory (SRAM) and dynamic random-access memory (DRAM), and/or non-volatile memory, such as read-only memory (ROM), erasable programmable ROM, flash memories, hard disks, optical disks, and magnetic tapes.

Thus, with the disclosed techniques, there is paging reduction which in turn improves upon power consumption performance for the mobile devices in 5G wireless networks. The disclosed techniques reduce unnecessary paging reception false alarm. Further, there is paging reduction linked with RF capability/feature support. Further, there is DRX/Paging cycle length adaptation and solution provides transition from paging reduction to normal paging and vice versa. Also, there is reducing monitoring of multiple beams for paging message reception.

While specific language has been used to describe the present disclosure, any limitations arising on account thereto, are not intended. As would be apparent to a person in the art, various working modifications may be made to the method in order to implement the inventive concept as taught herein. The drawings and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment.

We claim:

1. A method for reducing paging in a wireless communication, comprising:
    transmitting, by a network entity, a network message to a plurality of user equipment (UE), wherein the network message carries a network parameter and configuration information of a paging message scheduled to be transmitted at a predetermined time, wherein the configuration information includes a paging cycle, a paging frame (PF), a paging occasion (PO), a paging offset, a number of paging sub-groups in the cell (Nps), an indicating signal offset (ISO) and paging sub-groups information; and
    transmitting, by the network entity, an indicating signal at the indicating signal offset (ISO) prior to the scheduled transmission of the paging message, wherein the indicating signal indicates if at least one of the plurality of UE will be paged in next paging occasion, wherein transmitting the indicating signal comprises:
dividing a group of the plurality of user equipment associated with a common paging occasion (PO) into a plurality of paging sub-groups of the user equipment;
assigning each paging sub-group of the plurality of paging sub-groups, a unique paging sub-group identity; and
associating the paging sub-group identity to the indicating signal to indicate one of presence or absence of a paging Downlink Control Information (DCI) for each paging sub-group of the plurality of paging sub-groups,
wherein the paging sub-group identity is determined based on a pre-specified formula including the Nps, wherein the pre-specified formula is:

a paging_sub_group Identity=floor(User Equipment (UE)Identity(UE_ID)/($N*Ns$)) mod Nps, wherein N is number of paging frames and Ns is number of paging occasion per paging frame.

2. The method as claimed in claim 1, wherein the indicating signal is at least one of a paging early indication (PEI) and a paging wake-up signal (WUS), configured in an idle/inactive mode to indicate one of a presence of the paging DCI or an absence of the paging DCI.

3. The method as claimed in claim 1, wherein the indicating signal is a reference signal configured in an idle/inactive mode to indicate one of a presence of the paging DCI or an absence of the paging DCI.

4. The method as claimed in claim 3, wherein the reference signal is at least one of a channel state indicator reference signal (CSI-RS), a tracking reference signal (TRS), a secondary synchronization signal (SSS) and a demodulation reference signal (DMRS) and wherein at least one of pattern, sequence and presence of the reference signal indicates one of a presence of the paging DCI or an absence of the paging DCI.

5. The method as claimed in claim 1, wherein the indicating signal is a DCI signal configured in an idle/inactive mode to indicate one of a presence of the paging DCI or an absence of the paging DCI.

6. The method as claimed in claim 1, wherein the indicating signal is a reference signal configured in an idle/inactive mode to indicate one of a presence of the paging DCI for a paging sub-group or an absence of the paging DCI for the paging sub-group.

7. The method as claimed in claim 6, wherein the reference signal is at least one of a channel state indicator reference signal (CSI-RS), a tracking reference signal (TRS), a secondary synchronization signal (SSS) and a demodulation reference signal (DMRS) and wherein at least one of pattern, sequence and presence of the reference signal indicates one of a presence of the paging DCI for the paging sub-group and an absence of the paging DCI for the paging sub-group.

8. The method as claimed in claim 1, wherein the indicating signal is a DCI signal configured in an idle/inactive mode to indicate one of a presence of the paging DCI for a paging sub-group and an absence of the paging DCI for the paging sub-group, wherein the DCI signal includes a bitmap comprising plurality of bits and each bit in the bitmap represents a paging sub-group.

9. The method as claimed in claim 1, further comprising:
transmitting the paging sub-group identity to the plurality of user equipment of the paging sub-group using at least one of a radio resource control (RRC) signalling and a non-access stratum (NAS) signalling.

10. The method as claimed in claim 1, further comprising:
determining if the network entity supports transmitting the indicating signal.

11. The method as claimed in claim 1, further comprising:
enabling/disabling the indicating signal based on at least one of network load condition and power saving requirement of the user equipment.

12. The method as claimed in claim 1, further comprising:
configuring, by the network entity, a new paging cycle based on preferred paging cycle received from the user equipment, using at least one of the DCI, medium access control (MAC) control element (CE), broadcast signalling like SIB, and RRC signalling.

13. A method for reducing paging in a wireless communication, comprising:
receiving, by a user equipment (UE), a network message transmitted by a network entity, wherein the network message carries a network parameter and configuration information of a paging message scheduled to be transmitted at a predetermined time, wherein the configuration information includes a paging cycle, a paging frame (PF), a paging occasion (PO), a paging offset, number of paging sub-groups in the cell (Nps), an indicating signal offset (ISO) and paging sub-groups information;
determining, by the UE, the paging cycle, the paging frame (PF), the paging occasion (PO) and the paging-subgroups information, according to the network parameter;
receiving, by the UE, an indicating signal at the indicating signal offset (ISO) prior to receiving the scheduled transmission of the paging message at a predetermined time;
decoding, by the UE, the indicating signal to determine if the UE will be paged in next paging occasion based on the indicating signal; and
entering, by the UE, in a sleep mode upon determination that it will not be paged in the next paging occasion,
wherein decoding the indicating signal comprises:
determining if a paging sub-group identity associated with the indicating signal matches with paging sub-group identity of the UE, wherein the paging sub-group identity indicates a paging sub-group of UE's with which the UE is associated,
wherein the paging sub-group identity is determined as:

a paging_sub_group Identity=floor(User Equipment (UE)Identity(UE_ID)/($N*Ns$))mod Nps, wherein N is number of paging frames, Ns is number of paging occasion per paging frame and the Nps is number of paging sub-groups in a cell.

14. The method as claimed in claim 13, wherein the indicating signal is at least one of paging early indication (PEI) and a paging wake-up signal (WUS), configured in an idle/inactive mode to indicate one of a presence of a paging Downlink Control Information (DCI) or an absence of the paging DCI.

15. The method as claimed in claim 13, further comprising:
determining if the user equipment supports decoding the indicating signal.

16. The method as claimed in claim 13, further comprising:
selecting a transmitting-receiving beam pair before the paging occasion;
decoding at least one of the indicating signal and the paging message using the selected transmitting-receiving beam pair; and selecting a new transmitting-receiving beam pair if the decoding fails for at least one of the indicating signal and the paging message.

17. The method as claimed in claim 13, further comprising:
   transmitting, by the user equipment (UE), a preferred length of the paging cycle to the network entity, wherein the preferred length is indicated using at least one of UE assistance information message and medium access control (MAC) control element (CE) signalling; and
   receiving, by the user equipment (UE), a new paging cycle based on the preferred paging cycle.

18. A user equipment (UE) for reducing paging in a wireless communication, comprising:
   a transceiver;
   a memory; and
   a processor coupled to the memory and the transceiver, the processor is configured to:
      receive a network message transmitted by a network entity, wherein the network message carries a network parameter and configuration information of a paging message scheduled to be transmitted at a predetermined time, wherein the configuration information includes a paging cycle, a paging frame (PF), a paging occasion (PO), a paging offset, number of paging sub-groups in the cell (Nps), an indicating signal offset (ISO) and paging sub-groups information;
      determine the paging cycle, the paging frame (PF), the paging occasion (PO) and the paging sub-groups information, according to the network parameter;
      receive an indicating signal at the indicating signal offset (ISO) prior to receiving the scheduled transmission of the paging message at a predetermined time;
      decode the indicating signal to determine if the UE will be paged in the paging occasion based on the indicating signal; and
   enter by the UE, in a sleep mode upon determination that it will not be paged in next paging occasion,
      wherein the processor decodes the indicating signal by:
      determining if a paging sub-group identity associated with the indicating signal matches with a paging sub-group identity of the UE, wherein the paging sub-group identity indicates a paging sub-group of UE's with which the UE is associated,
      wherein the processor is further configured to determine the paging sub-group identity as:

a paging_sub_group Identity=floor(User Equipment (UE)Identity(UE_ID)/($N*Ns$))mod Nps, wherein N is number of paging frames, Ns is number of paging occasion per paging frame and the Nps is number of paging sub-groups in a cell.

* * * * *